United States Patent
Park et al.

(10) Patent No.: US 9,614,783 B2
(45) Date of Patent: Apr. 4, 2017

(54) APPARATUS AND METHOD FOR DETERMINING SOURCE DEVICE IN CONTENTS SHARING SYSTEM

(71) Applicants: Samsung Electronics Co., Ltd, Gyeonggi-do (KR); Korea Advanced Institute of Science and Technology, Daejeon (KR)

(72) Inventors: Yongsuk Park, Seoul (KR); Sun-Mi Kim, Seoul (KR); Dan-Keun Sung, Daejeon (KR); Chan-Hyun Youn, Daejeon (KR); Jin-Won Kim, Seoul (KR); Ji-Young Cha, Jeju-do (KR); Tae-Hoon Kim, Daejeon (KR); Dong-Ki Kang, Daejeon (KR); Hee-Jae Kim, Daejeon (KR); Yong-Sung Park, Daejeon (KR); Young-Joo Han, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 375 days.

(21) Appl. No.: 13/838,549

(22) Filed: Mar. 15, 2013

(65) Prior Publication Data

US 2013/0246616 A1    Sep. 19, 2013

(30) Foreign Application Priority Data

Mar. 16, 2012  (KR) ........................ 10-2012-0027133

(51) Int. Cl.
*G06F 15/173* (2006.01)
*H04L 12/927* (2013.01)
(Continued)

(52) U.S. Cl.
CPC ............ *H04L 47/808* (2013.01); *H04L 47/19* (2013.01); *H04L 67/101* (2013.01);
(Continued)

(58) Field of Classification Search
USPC ..... 709/224, 226, 239, 203, 238; 705/14.48; 715/747; 725/62; 455/515; 370/329;
(Continued)

(56) References Cited

U.S. PATENT DOCUMENTS 7,783,777 B1    8/2010   Pabla et al.
8,171,173 B2 *  5/2012   Soo et al. ................... 709/226
(Continued)

FOREIGN PATENT DOCUMENTS

EP          1 630 684 A1     3/2006
KR     10-2003-0056304 A     7/2003
(Continued)

OTHER PUBLICATIONS

International Search Report dated May 31, 2013 in connection with International Patent Application No. PCT/KR2013/001654.
(Continued)

*Primary Examiner* — Quang N Nguyen

(57) ABSTRACT

A method for determining a source and a transmission path to provide content includes receiving a message comprising at least one of channel information of a link between a request device which requests content download and a central management device, available resource amount information of a candidate device, channel information of a link between the candidate device and the central management device, and channel information of a link between the request device and one candidate device. The method also includes determining a source device and the transmission path for providing the content to the request device using an available resource amount of the candidate device, a data (Continued)

rate of the link between the request device and the central management device, a data rate of the link between the request device and the candidate device, and a data rate of the link between the candidate device and the central management device.

9 Claims, 6 Drawing Sheets

(51) Int. Cl.
*H04L 12/801* (2013.01)
*H04L 29/08* (2006.01)
*H04W 4/00* (2009.01)

(52) U.S. Cl.
CPC ...... *H04L 67/1008* (2013.01); *H04L 67/1063* (2013.01); *H04L 67/327* (2013.01); *H04W 4/008* (2013.01)

(58) Field of Classification Search
USPC .......................................................... 707/728
See application file for complete search history.

(56) References Cited

U.S. PATENT DOCUMENTS

| | | | |
|---|---|---|---|
| 8,370,513 B2 * | 2/2013 | Kim | 709/224 |
| 8,612,619 B2 * | 12/2013 | Guo | H04L 12/189 709/228 |
| 8,615,431 B1 * | 12/2013 | Bell et al. | 705/14.48 |
| 8,774,048 B2 * | 7/2014 | Raveendran | H04L 65/605 370/254 |
| 8,787,266 B2 * | 7/2014 | Matischek et al. | 370/329 |
| 8,971,346 B2 * | 3/2015 | Sevier | H04L 67/104 370/229 |
| 2004/0010617 A1 * | 1/2004 | Akahane et al. | 709/239 |
| 2005/0266835 A1 | 12/2005 | Agrawal et al. | |
| 2006/0059248 A1 | 3/2006 | Ikeda | |
| 2006/0146703 A1 | 7/2006 | Cha et al. | |
| 2008/0034064 A1 | 2/2008 | Choi et al. | |
| 2009/0157880 A1 | 6/2009 | Lee et al. | |
| 2009/0241147 A1 * | 9/2009 | Kim et al. | 725/62 |
| 2010/0232441 A1 | 9/2010 | Verma et al. | |
| 2011/0142017 A1 | 6/2011 | Coldren | |
| 2011/0142061 A1 | 6/2011 | Wang et al. | |
| 2011/0159908 A1 | 6/2011 | Terry et al. | |
| 2011/0179455 A1 | 7/2011 | Thompson | |
| 2012/0066495 A1 | 3/2012 | Hao et al. | |
| 2012/0272156 A1 * | 10/2012 | Kerger et al. | 715/747 |
| 2013/0007100 A1 * | 1/2013 | Trahan | H04L 67/02 709/203 |
| 2013/0231151 A1 * | 9/2013 | Kneckt et al. | 455/515 |
| 2014/0143244 A1 * | 5/2014 | Satish | G06F 17/30867 707/728 |
| 2016/0080577 A1 * | 3/2016 | Norris | H04S 7/304 455/412.1 |

FOREIGN PATENT DOCUMENTS

| | | |
|---|---|---|
| KR | 10-2004-0032315 A | 4/2004 |
| KR | 10-2006-0007843 A | 1/2006 |
| KR | 10-2006-0068445 A | 6/2006 |
| KR | 10-2007-0059803 A | 6/2007 |
| KR | 10-2007-0076933 A | 7/2007 |
| KR | 10-2007-0095020 | 9/2007 |
| KR | 10-2009-0064240 A | 6/2009 |
| KR | 10-2011-0035667 A | 4/2011 |
| WO | WO 2004/049182 A1 | 6/2004 |

OTHER PUBLICATIONS

Written Opinion of International Searching Authority dated May 31, 2013 in connection with International Patent Application No. PCT/KR2013/001654.

Extended European Search Report dated Jan. 20, 2016 in connection with European Patent Application No. 13762023.3; 10 pages.

Li, et al.; "A Novel Team-Centric Peer Selection Scheme for Distributed Wireless P2P Networks"; WCNC 2009; IEEE; Budapest; Apr. 5-8, 2009; 7 pages.

* cited by examiner

APPARATUS AND METHOD FOR DETERMINING SOURCE DEVICE IN CONTENTS SHARING SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Mar. 16, 2012, and assigned Serial No. 10-2012-0027133, the entire disclosure of which is hereby incorporated by reference.

TECHNICAL FIELD OF THE INVENTION

The present disclosure relates generally to content sharing over a network.

BACKGROUND OF THE INVENTION

In recent, with rapid growth of performance of devices capable of storing and sharing contents and transport protocol technologies, content sharing in a distributed storage environment is drawing great attention. The distributed storage environment, which is contrary to a conventional centralized storage environment, stores contents to share to a plurality of devices capable of storing and sharing the contents, rather than storing all of contents to share to a centralized storage device such as media server.

In the distributed storage environment, the same content can exist in different devices. Herein, the content common in the different devices is referred to as multi-copies. In the distributed storage environment, there can be a plurality of transmission paths between a request device requesting the content sharing and a source device holding the content to share. In this example, depending on which source device provides the content to the request device, channel quality of the transmission path, hardware performance of a transmitter, the remaining power, a Central Processing Unit (CPU) usage, and the remaining memory capacity differ. Thus, as the data rate of the content varies according to which source device is selected, a method for selecting an optimal source device is needed.

SUMMARY OF THE INVENTION

To address the above-discussed deficiencies of the prior art, it is a primary aspect of the present disclosure to provide an apparatus and a method for selecting an optimal source device and an optimal transmission path in a content sharing system.

Another aspect of the present disclosure is to provide an apparatus and a method for selecting a source device and a transmission path by considering channel quality in a content sharing system.

Yet another aspect of the present disclosure is to provide an apparatus and a method for selecting a source device by considering an available resource amount in a content sharing system.

Yet another aspect of the present disclosure is to provide an apparatus and a method for selecting a source device by considering hardware performance in a content sharing system.

A further aspect of the present disclosure is to provide an apparatus and a method for reducing overhead required to obtain channel quality in a content sharing system.

According to one aspect of the present disclosure, a method for determining a source and a transmission path to provide content in a content sharing system includes receiving at least one message comprising at least one of channel information of a link between a request device which requests content download and a central management device, available resource amount information of at least one candidate device having content requested for the download, channel information of a link between the at least one candidate device and the central management device, and channel information of a link between the request device and the at least one candidate device; and determining at least one source device and at least one transmission path for providing the content to the request device using an available resource amount of the at least one candidate device, a data rate of the link between the request device and the central management device, a data rate of the link between the request device and the at least one candidate device, and a data rate of the link between the at least one candidate device and the central management device. The channel information includes at least one of a channel quality value and a data rate, and the available resource amount includes at least one of a Central Processing Unit (CPU) usage, a remaining memory capacity, and a remaining battery power.

According to another aspect of the present disclosure, an operating method of a user device in a content sharing system includes measuring a channel quality with a central management device using a signal received to request content download; and transmitting the channel quality to the central management device using a message transmitted to request the content download. The operating method of the user device may further include when the central management device notifies at least one candidate device for providing content requested for the download, measuring a channel quality with the at least one candidate device; and transmitting the channel quality of the at least one candidate device, to the central management device.

According to yet another aspect of the present disclosure, an operating method of a user device includes when a central management device requests available resource amount information, measuring a channel quality with the central management device using a signal received to request the available resource amount information; and transmitting the available resource amount information and the channel quality to the central management device.

According to still another aspect of the present disclosure, an apparatus for determining a source and a transmission path to provide content in a content sharing system includes a communication unit for receiving at least one message which comprises at least one of channel information of a link between a request device which requests content download and a central management device, available resource amount information of at least one candidate device having content requested for the download, channel information of a link between the at least one candidate device and the central management device, and channel information of a link between the request device and the at least one candidate device; and a control unit for determining at least one source device and at least one transmission path for providing the content to the request device using an available resource amount of the at least one candidate device, a data rate of the link between the request device and the central management device, a data rate of the link between the request device and the at least one candidate device, and a data rate of the link between the at least one candidate device and the central management device. The channel information includes at least one of a channel quality value and a data rate, and the available resource amount includes at least one of a CPU usage, a remaining memory capacity, and a remaining battery power.

According to a further aspect of the present disclosure, a user device in a content sharing system includes a control unit for measuring a channel quality with a central management device using a signal received to request content download; and a communication unit for transmitting the channel quality to the central management device using a message transmitted to request the content download. When the central management device notifies at least one candidate device for providing content requested for the download, the control unit measures a channel quality with the at least one candidate device, and the communication unit transmits the channel quality of the at least one candidate device, to the central management device.

According to a further aspect of the present disclosure, a user device in a content sharing system includes a control unit for, when a central management device requests available resource amount information, measuring a channel quality with the central management device using a signal received to request the available resource amount information; and a communication unit for transmitting the available resource amount information and the channel quality to the central management device.

Other aspects, advantages, and salient features of the disclosure will become apparent to those skilled in the art from the following detailed description, which, taken in conjunction with the annexed drawings, discloses exemplary embodiments of the invention.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for selecting an optimal source device and an optimal transmission path in a content sharing system. In particular, the present disclosure provides a technique for selecting a source device and a transmission path by considering multi-copies and Quality of Service (QoS) for the content sharing when a direct link is connectable between devices.

Figure 1:
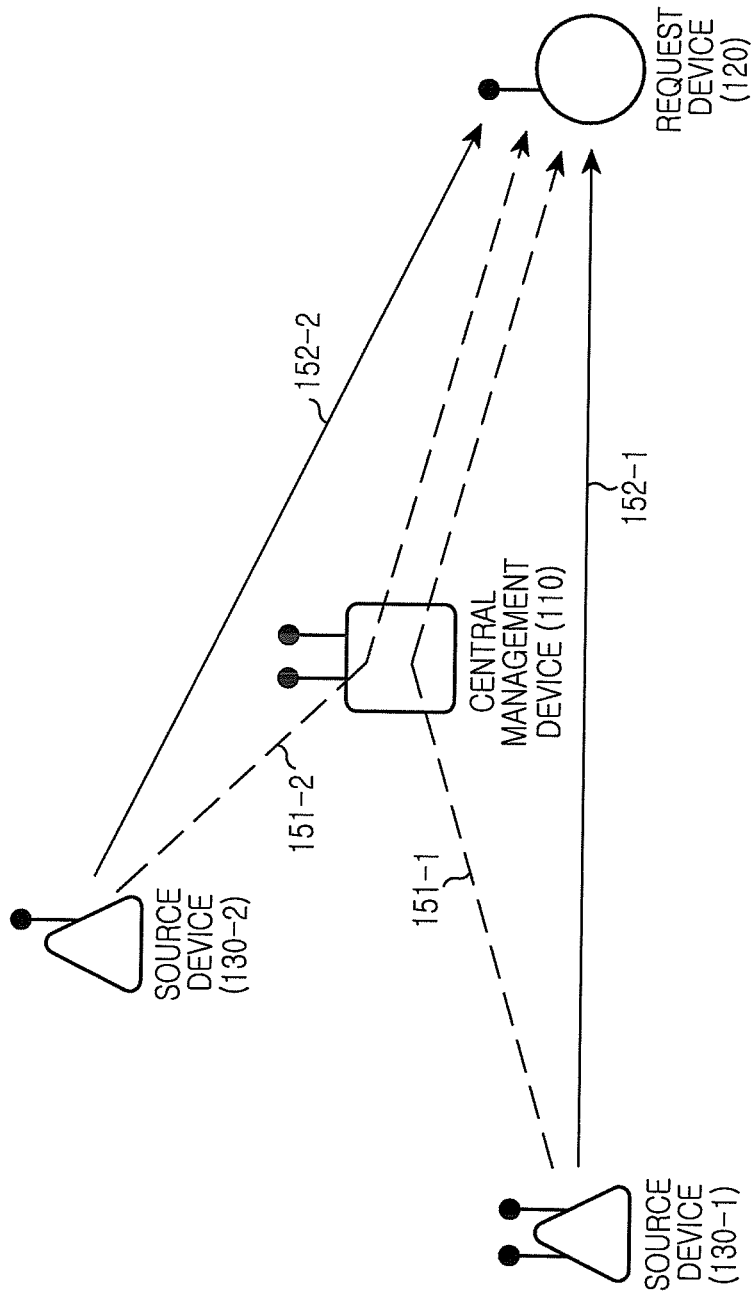
FIG. 1 illustrates the simplified content sharing in a content sharing system according to an exemplary embodiment of the present disclosure.

FIG. 1 illustrates a simplified diagram of content sharing in a content sharing system according to an exemplary embodiment of the present disclosure.

Referring to FIG. 1, a central management device 110 can function as a gateway for connecting with an external communication network. The central management device 110 can also serve as an Access Point (AP). The central management device 110 possesses information of all of contents and information of devices in a distributed storage environment, and holds a list of the contents. The central management device 110 can be referred to as a Home Cloud Gateway (HCG).

It is assumed that content requested by a request device 120 is stored to not only the central management device 110 but also a source device A 130-1 and a source device B 130-2. That is, the content is the multi-copy. As shown in FIG. 1, there are several paths from the source devices 130-1 and 130-2 to the request device 120, and the paths include 2-hop paths 151-1 and 151-2 and 1-hop paths 152-1 and 152-2. Herein, the 1-hop paths 152-1 and 152-2, that is, direct links between the source devices 130-1 and 130-2 and the request device 120 can be established according to a Peer-to-Peer (P2P) protocol such as Wireless Fidelity-Direct (WiFi-D) and Bluetooth.

With the several transmission paths as shown in FIG. 1, it is necessary to select the transmission path which can exhibit an optimal data rate. In so doing, candidates of the source device for providing the content include the source devices; that is, other user devices and the central management device. The selection of the optimal transmission path signifies that the QoS of the content sharing can be optimized. Factors affecting the data rate largely include the number of antennas, the transport protocol, the channel quality on the transmission path, and the available resource amount (e.g., a processor or Central Processing Unit (CPU) usage, the remaining memory capacity, and the remaining battery power) of the source device. As the number of the antennas increases, a diversity gain or a multiplexing gain increases. According to the channel quality, a maximum data rate which ensures a particular reliability or a maximum allowable error rate varies. The maximum data rate for providing a particular channel quality differs per transport protocol. The current available resource amount (e.g., the CPU usage, the remaining memory capacity, and the remaining battery power) of the source device affects the processing of the source device to transmit the content to share.

In particular, when the available resource amount of the source device is satisfactory; that is, when the processing capability of the source device is scarcely used, a bottleneck of the performance of the source device does not arise. In this example, the number of the antennas, the transport protocol, and the channel quality mainly affect the data rate. However, when the available resource amount of the source device is deficient; that is, when most of the processing capability of the source device is used because of high CPU usage or little memory capacity remained, the bottleneck of the performance of the source device arises and thus the CPU of the source device cannot spare a lot of time to transmit the content. As a result, the data rate drops.

That is, since the performance of the source device can be the major factor affecting the data rate, the available resource amount should be considered in selecting the source device for providing the maximum data rate. More specifically, it is advantageous to exclude the source device which is likely to exhibit inadequate performance and interrupt the content sharing, from the selection based on a threshold which is obtained on experiment. The battery greatly affects the data rate as well. For example, when the battery is dead during the transmission, the content transmission is aborted. Hence, it is advantageous to exclude the source device which has the insufficient battery power, from the selection based on a threshold obtained on experiment.

The selection of the source device and the transmission path is explained in brief. The request device requests the content, the source device possesses the content, and the central management device manages the contents in the network. The central management device obtains the CPU usage, the remaining memory capacity, and the remaining battery power of the source devices which hold the content requested by the request device, and the channel among the central management device, the source devices, and the request device. The source device for the transmission is selected based on the CPU usage, the remaining memory capacity, and the remaining battery power of the source devices, which are obtained by the central management device, and the channel quality of the 1-hop path between the selected source devices and the request device is analyzed. Based on the channel qualities, the central management device or the request device determines whether the transmission path of the source device of the highest data rate is the 1-hop path which delivers the content from the source device directly to the request device, or the 2-hop path which delivers the content from the source device to the request device via the central management device. When the central management device is selected as the source device, only the 1-hop path is considered. Next, the request device receives the content through the determined optimal path.

Figure 2:
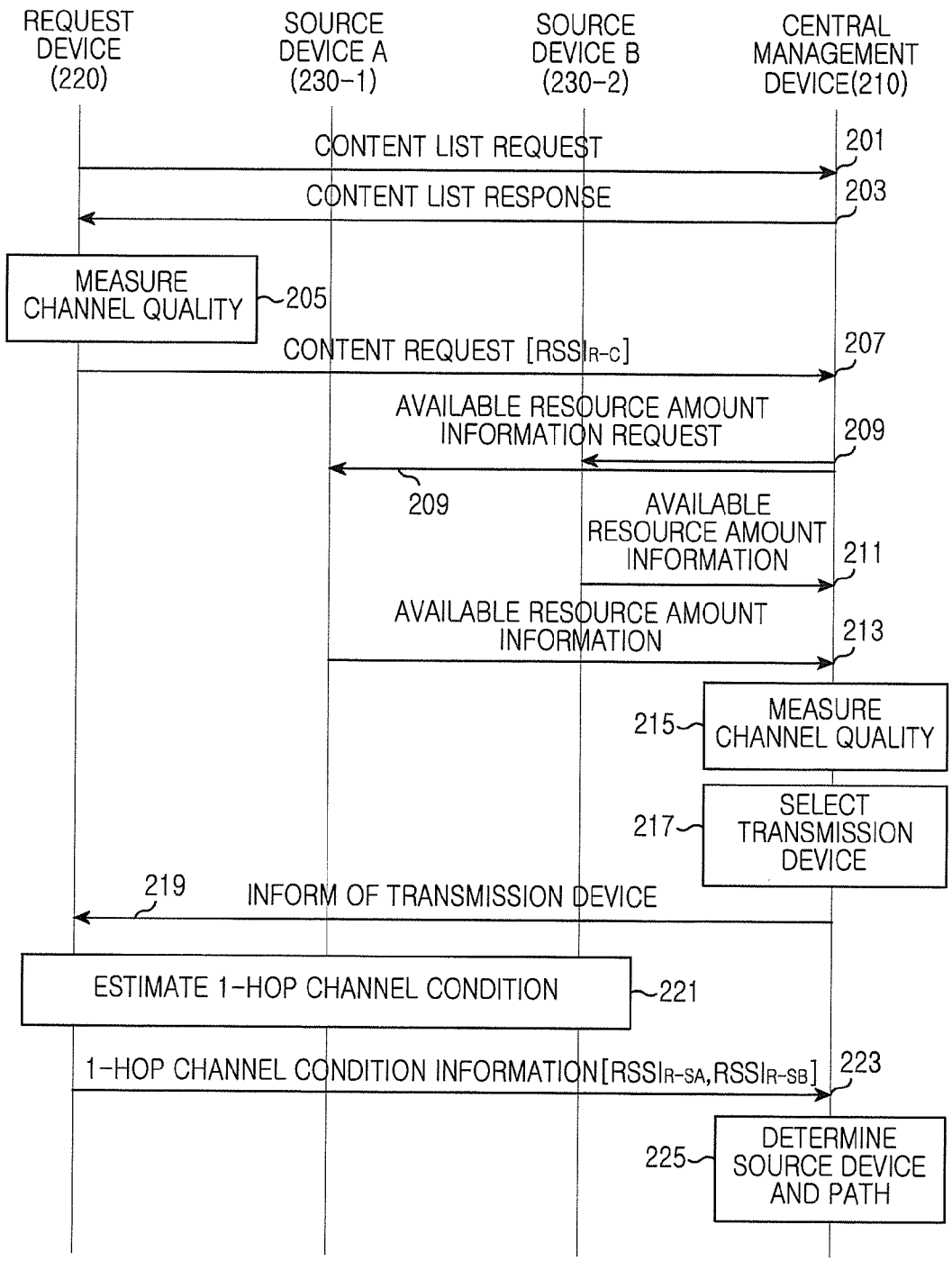
FIG. 2 illustrates a method for selecting a source device and a transmission path in the content sharing system according to an exemplary embodiment of the present disclosure.

FIG. 2 illustrates a method for selecting the source device and the transmission path in the content sharing system according to an exemplary embodiment of the present disclosure.

Referring to FIG. 2, the request device 220 requests the content list to the central management device 210 in step 201, and the central management device 210 transmits the content list to the request device 220 in step 203. The request device 220 measures the channel quality between the request device 220 and the central management device 210 in step 205. That is, the request device 220 measures the channel quality between the request device 220 and the central management device 210 using the signal transmitted from the central management device 210 to deliver the content list. The channel quality can use one of Signal to Noise Ratio (SNR), Signal to Interference and Noise Ratio (SINR), Carrier to Interference and Noise Ratio (CINR), Carrier to Noise Ratio (CNR), and Received Signal Strength Indication (RSSI). Herein, the channel quality is the RSSI by way of example.

The request device 220 requests a particular content in step 207. That is, the request device 220 sends a message requesting to download the content. The message includes a channel quality metric, for example, the RSSI between the request device 220 and the central management device 210. Hence, the central management device 210 can obtain the channel quality between the request device 220 and the central management device 210. The RSSI between the request device 220 and the central management device 210 is used to predict the data rate along the 2-hop path. Alternatively, the central management device 210 can directly measure the channel quality between the request device 220 and the central management device 210. For doing so, the signal for requesting the content list in step 201 or the signal for requesting the content download in step 207 can be used. It is advantageous to ensure reciprocity of the bi-directional channels between the request device 220 and the central management device 210.

In step 209, the central management device 210 requests the available resource amount information to the source devices 230-1 and 230-2 having the content requested by the request device 220. The available resource amount includes at least one of the CPU usage, the remaining memory capacity, and the remaining battery power. The central management device 210 can know that the source devices 230-1 and 230-2 have the content by retrieving the source devices having the content requested by the request device 220. That is, the central management device 210 selects the source devices 230-1 and 230-2 as candidate devices.

In step 209, the central management device 210 requests the available resource amount information to each of the source devices 230-1 and 230-2. Hence, in steps 211 and 213, the source device A 230-1 and the source device B 230-2 transmit the available resource amount information. The available resource amount information includes at least one of the CPU usage, the remaining memory capacity, and the remaining battery power. That is, the source device A 230-1 transmits the source device A's 230-1 available resource amount information, and the source device B 230-2 transmits the source device B's 230-2 available resource amount information.

In step 215, the central management device 210 estimates the RSSI between the source device A 230-1 and the central management device 210, and the RSSI between the source device B 230-2 and the central management device 210. That is, the central management device 210 estimates the channel quality with the source device A 230-1 using the signal received in step 211, and the channel quality with the source device B 230-2 using the signal received in step 213. The RSSI between the source devices 230-1 and 230-2 and the central management device 210 is used to predict the data rate along the 2-hop path. The RSSI between the source device A 230-1 and the central management device 210 and the RSSI between the source device B 230-2 and the central management device 210 can be estimated by the source device A 230-1 and the source device B 230-2. In this example, the source device A 230-1 and the source device B 230-2 can transmit the RSSI together with the available resource amount information. Notably, it is advantageous to ensure the reciprocity of the bi-directional channels between the source device 230-1 and the central management device 210 and the bi-directional channels between the source device 230-2 and the central management device 210.

In step 217, the central management device 210 selects at least one transmission device from the source devices 230-1 and 230-2 having the multi-copies using the collected information; that is, using the available resource amounts of the source devices 230-1 and 230-2. The transmission device represents a device which can ensure the minimum QoS required to transmit the content among the candidate devices having the multi-copies. A condition for selecting the transmission device can differ in various implementations. For example, the central management device 210 can select, among the candidate devices, the rest excluding the device which meets at least one of the CPU usage over a first threshold $TH_{CPU}$, the remaining, memory capacity below a second threshold $TH_{MEM}$, and the remaining battery power below a third threshold $TH_{BAT}$, as the transmission device. In step 219, the central management device 210 notifies the selected transmission device to the request device 220. In FIG. 2, it is assumed that both of the source device A 230-1 and the source device B 230-2 are selected as the transmission devices.

In step 221, the request device 220 measures the 1-hop channel quality of the source device A 230-1 and the source device B 230-2 which are selected as the transmission devices. That is, the request device 220 receives the signals from the source device A 230-1 and the source device B 230-2 and measures the channel quality using the signals. A specific procedure for measuring the 1-hop channel quality can differ according to the protocol of the direct links between the request device 220 and the source devices 230-1 and 230-2. For example, the protocol of the direct link can adopt WiFi-D and Bluetooth. The RSSIs between the request device 220 and the source devices 230-1 and 230-2 are used to predict the data rate on the 1-hop path.

Using WiFi-D, to measure the 1-hop channel quality, the source devices 230-1 and 230-2 and the request device 220 should be grouped. After grouping with the source devices, the request device can request the source devices to send a certain message and measure the channel quality using the received message. Yet, when the operation frequency to be used in the group is the same as the operation frequency used by the request device 220, the grouping for the 1-hop channel quality measurement can be omitted. Before the grouping, the request device 220 can measure the channel quality using a probe request message and a probe response message transmitted and received for the grouping. In so doing, when one of the source devices and the source device's 1-hop transmission path are finally selected as the source device and the transmission path for providing the optimal data rate, the request device can receive the content by grouping only with the selected source device.

In step 223, the request device 220 provides the 1-hop channel quality information to the central management device 210. That is, the request device 220 informs the central management device 210 of the RSSI between the request device 200 and the source device A 230-1, and the RSSI between the request device 220 and the source device B 230-2. When the source device A 230-1 and the source device B 230-2 are incapable of building the direction link between the devices, steps 219 through 223 can be omitted.

In step 225, the central management device 210 obtaining the channel quality of all of the links of the 2-hop paths and the 1-hop paths determines the optimal transmission device and path by considering at least one of the available resource amount and the hardware characteristics of the source devices 230-1 and 230-2, and the channel quality of the links. For example, the optimal transmission device and path can be determined based on the data rate maximization.

In FIG. 2, the RSSI transmitted in step 207 is measured using the signal received in step 203. Alternatively, when the request device 220 obtains the channel quality between the request device 220 and the central management device 210 before step 201, the channel quality can be transmitted together with the content list request in step 201.

The RSSI transmitted in step 223 are measured in step 221. Alternatively, when the request device 220 obtains the RSSIs between the request device 220 and the source devices 230-1 and 230-2 before step 201, the RSSIs can be transmitted together with the content list request in step 201 or together with the content request in step 207.

In FIG. 2, the central management device 210 considers only the source devices 230-1 and 230-2 as the device for providing the content. However, when the central management device 210 also has the content requested by the request device 220, the central management device 210 can be considered as the candidate for providing the content. In this example, the central management device 210 takes into account the central management device's 210 available resource amount and the channel quality with the request device 220. Yet, as for the central management device 210, the 2-hop path is not considered.

In FIG. 2, the central management device 210 determines the source device and the transmission path based on the data rate. In so doing, the central management device 210 can predict the data rate of the 2-hop path of the source device A 230-1 based on Equation 1.

$$R_{SA,2-hop} = \frac{R_{SA}(RSSI_{SA-C})R_c(RSSI_{C-R})}{R_{SA}(RSSI_{SA-C}) + R_c(RSSI_{C-R})} \qquad (1)$$

In Equation 1, $R_{SA,2-hop}$ denotes the data rate of the 2-hop path for the source device A 230-1, $R_{SA}(\ )$ denotes a data rate function of the source device A 230-1, $RSSI_{SA-C}$ denotes the RSSI between the RSSI between the source device A 230-1 and the central management device 210, $RSSI_{C-R}$ denotes the RSSI between the request device 220 and the central management device 210, and $R_C(\ )$ denotes a data rate function of the central management device 210.

The central management device 210 can predict the data rate of the 1-hop path of the source device A 230-1 based on Equation 2.

$$R_{SA,1\text{-}hop} = R_{SA}(\text{RSSI}_{SA\text{-}R}) \qquad (2)$$

In Equation 2, $R_{SA,1\text{-}hop}$ denotes the data rate of the 1-hop path; that is, the direct path to the source device A 230-1, $R_{SA}()$ denotes the data rate function of the source device A 230-1, and $\text{RSSI}_{SA\text{-}R}$ denotes the RSSI between the source device A 230-1 and the request device 220.

In Equation 2 and Equation 3, the data rate function is defined based on the transport protocol and the number of the antennas. The data rate function outputs a maximum data rate ensuring a particular reliability or a maximum allowable error rate among the data rates which are provided by the corresponding transport protocol based on the instantaneous channel quality in consideration of the number of the antennas. The present disclosure adopts the RSSI as the example of the channel quality. An example of the data rate function includes is a data rate table based on a Modulation and Coding Scheme (MCS) index and the number of the antennas as described in Institute of Electrical and Electronics Engineers (IEEE) 802.11n. Part of the data rate table of the 802.11n is shown in Table 1.

TABLE 1

| MSC index | data rate [Mb/s] |
|---|---|
| 1 antenna | |
| 0 | 13.5 |
| 1 | 27.0 |
| 2 | 40.5 |
| 3 | 54.0 |
| 4 | 81.0 |
| 5 | 108.0 |
| 6 | 121.5 |
| 7 | 135.0 |
| 2 antenna | |
| 8 | 27.0 |
| 9 | 54.0 |
| 10 | 81.0 |
| 11 | 108.0 |
| 12 | 162.0 |
| 13 | 216.0 |
| 14 | 243.0 |
| 15 | 270.0 |

In some examples, the central management device 210 itself can know the data rate of each link. For example, the protocol such as IEEE 802.11a/b/g/n describes to select the maximum data rate exhibiting a particular reliability or the maximum allowable error rate according to the channel quality between the transmitter and the receiver. The maximum data rate can be obtained directly from the AP or each device. In this example, the central management device 210 can directly obtain the data rate and accordingly the data rate calculation is unnecessary. The central management device 210 can predict the data rate of the 2-hop path of the source device A 230-1 based on Equation 3.

$$R_{SA,2\text{-}hop} = \frac{R_{SA-C} \cdot R_{C-R}}{R_{SA-C} + R_{C-R}} \qquad (3)$$

In Equation 3, $R_{SA,2\text{-}hop}$ denotes the data rate of the 2-hop path for the source device A 230-1, $R_{SA-C}$ denotes an end data rate between the source device A 230-1 and the central management device 210, and $R_{C-R}$ denotes an end data rate between the central management device 210 and the request device 220.

The central management device 210 can predict the data rate of the 1-hop path of the source device A 230-1 based on Equation 4.

$$R_{SA,1\text{-}hop} = R_{SA-R} \qquad (4)$$

In Equation 4, $R_{SA,1\text{-}hop}$ denotes the data rate of the 1-hop path of the source device A 230-1, and $R_{SA-R}$ denotes the end data rate between the source device A 230-1 and the request device 220.

The method described above in relation with FIG. 2 under of the present invention may be provided as one or more instructions in one or more software modules, or computer programs stored in an electronic device including a portable terminal.

Figure 3:
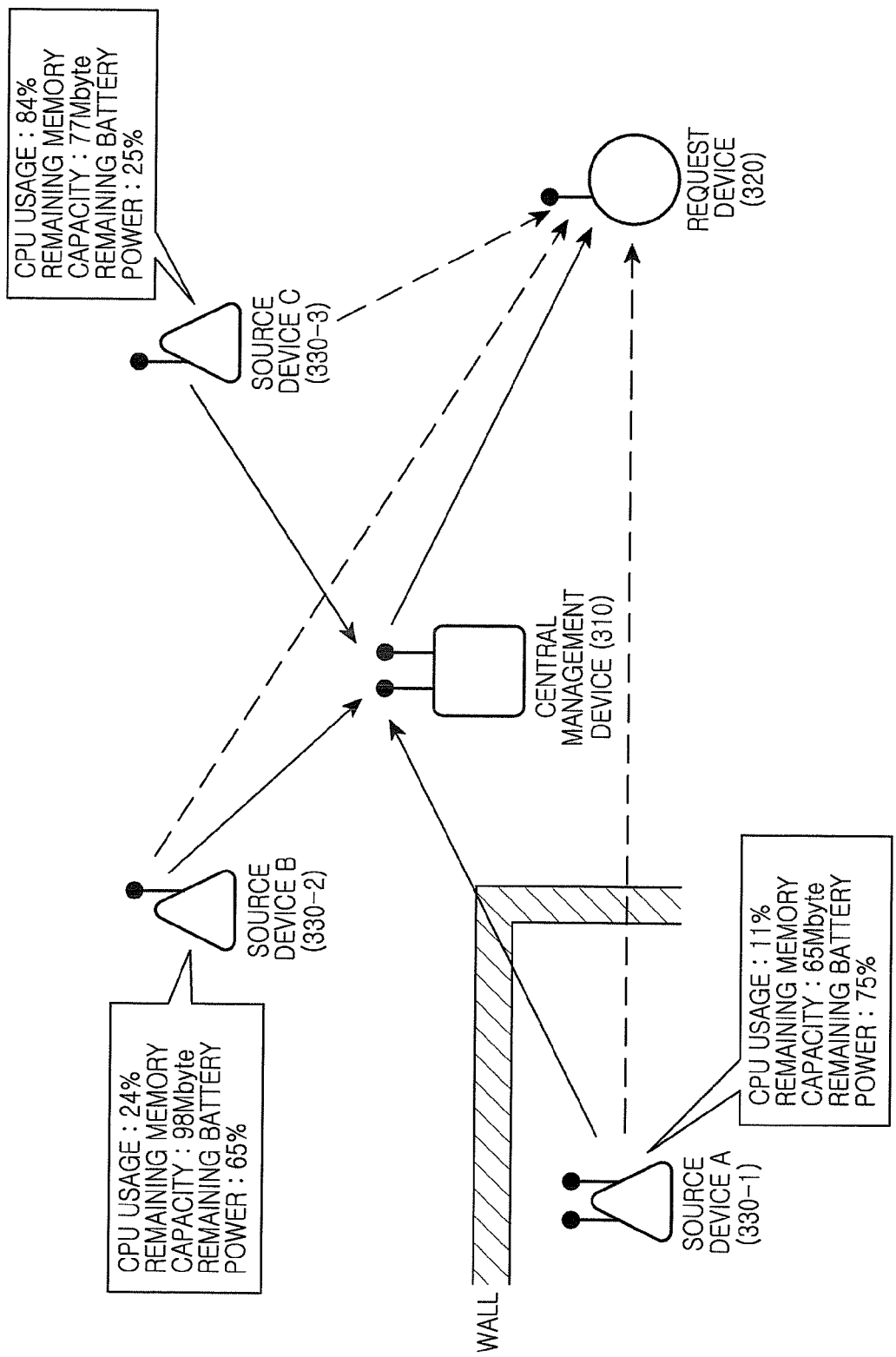
FIG. 3 illustrates a specific situation in the content sharing system according to an exemplary embodiment of the present disclosure.

FIG. 3 illustrates a specific situation in the content sharing system according to an exemplary embodiment of the present disclosure.

In FIG. 3, the content requested by a request device 320 is the multi-copy, and a source device A 330-1, a source device B 330-2, and a source device C 330-3 possess the multi-copies. The devices 320, 330-1, 330-2 and 330-3 support the communication protocol allowing the direct link transmission, such as WiFi-D and Bluetooth. The source device A 330-1 is isolated within the room, signals transmitted and received to and from the source device A 330-1 should penetrate the wall, and all of the other devices 310, 320, 330-2 and 330-3 including the request device 320 are placed in the living room.

Referring to FIG. 3, there are six transmission paths between the source devices 330-1, 330-2 and 330-3 and the request device 320. Provided that a threshold $\text{TH}_{CPU}$ for the CPU usage is 65%, the CPU usage of the source device C 330-3 is 84%, which exceeds the threshold of the CPU usage. Hence, the source device C 330-3 is excluded from the transmission device. Namely, the source device A 330-1 and the source device B 330-2 are selected as the transmission devices. As a result, the number of the transmission paths to predict the data rate in order to select the source device for providing the optimal data rate to deliver the content among the transmission devices, is 4 (=the number of the transmission devices×the number of the paths of each device=2×2).

The request device 320 can share the content according to an exemplary embodiment of the present disclosure. When the request device 320 requests particular content to the central management device 310, the central management device 310 obtains the channel quality with the request device 320. Using the information of all of the devices in the network, the central management device 310 identifies the source device A 330-1, the source device B 330-2, and the source device C 330-3 holding the content, and obtains the CPU usage, the remaining memory capacity, and the remaining battery power of the source devices, and the channel quality with the source devices 330-1, 330-2, and 330-3.

The central management device 310 excludes the source device of the CPU usage exceeding a threshold and the source device of the remaining memory capacity or the remaining battery power falling below a threshold, from the transmission devices, and transmits information of the remaining source device to the request device 320. Accordingly, the source device C 330-3 is excluded, and the information of the source device A 330-1 and the source device B 330-2 is transmitted. The request device 320 obtains the 1-hop channel quality in relation with the transmission devices and notifies the channel quality to the central management device 310.

The central management device 310 obtaining the channel quality of the 1-hop path determines the transmission device and the transmission path for the maximum data rate by considering every transmission device and the channel quality of the transmission paths (1 hop/2 hops) of the transmission devices. In so doing, Equation 1 through Equation 4 can be used to predict the data rate. Next, the request device 320 can receive the content using the selected transmission device and transmission path.

Table 2 shows the information used to determine the source device and the path in the situation of FIG. 3.

TABLE 2

|  |  | source device A | | source device B | | source device C | |
|---|---|---|---|---|---|---|---|
| remaining battery power | | 75% | | 65% | | 25% | |
| CPU usage percent | | 11% | | 24% | | 84% | |
| remaining memory capacity | | 65 MByte | | 98 MByte | | 77 MByte | |
| link | | 1-hop | 2-hop | 1-hop | 2-hop | 1-hop | 2-hop |
| data rate of 1-hop path [Mbps] | source device ↔ request device | 39 | — | 72 | — | 65 | — |
| data rate of 2-hop path [Mbps] | source device ↔ management device | — | 48 | — | 65 | — | 72 |
|  | management device ↔ request device | | | 58 | | | |
| end date rate | | 39 | 26.26 | 72 | 30.65 | 65 | 32.12 |
| selection (yes, no) | | X | X | O | X | X | X |
| etc. | | | | maximum data rate | | exceed threshold of CPU usage | exceed threshold of CPU usage |

In Table 2, the source device C 330-3, of which the CPU usage exceeds the CPU threshold, is excluded from the transmission device regardless of the channel quality. The source device A 330-1 and the source device B 330-2 can share the content using the 1-hop path and the 2-hop path. Since the 1-hop path of the source device B 330-2 provides the maximum data rate, the source device B 330-2 is determined as the transmission device and the 1-hop path is determined as the transmission path.

Otherwise, the request device 320 receives the content from any one of the source device A 330-1, the source device B 330-2, and the source device C 330-3. When the source device C 330-3 is selected, it is likely that the source device C 330-3 is being used for the content sharing and other purpose and thus the source device C 330-3 cannot provide the optimal QoS. When the source device A 330-1 is selected, the source device A 330-1, which is placed in the different room from the request device 320, provides the relatively lower data rate than the source device B 330-2. Even when the source device B 330-2 is selected and the 2-hop path is selected, the relatively low data rate is expected. That is, though the content sharing is feasible, it is highly likely that the optimal QoS is not guaranteed.

Figure 4:
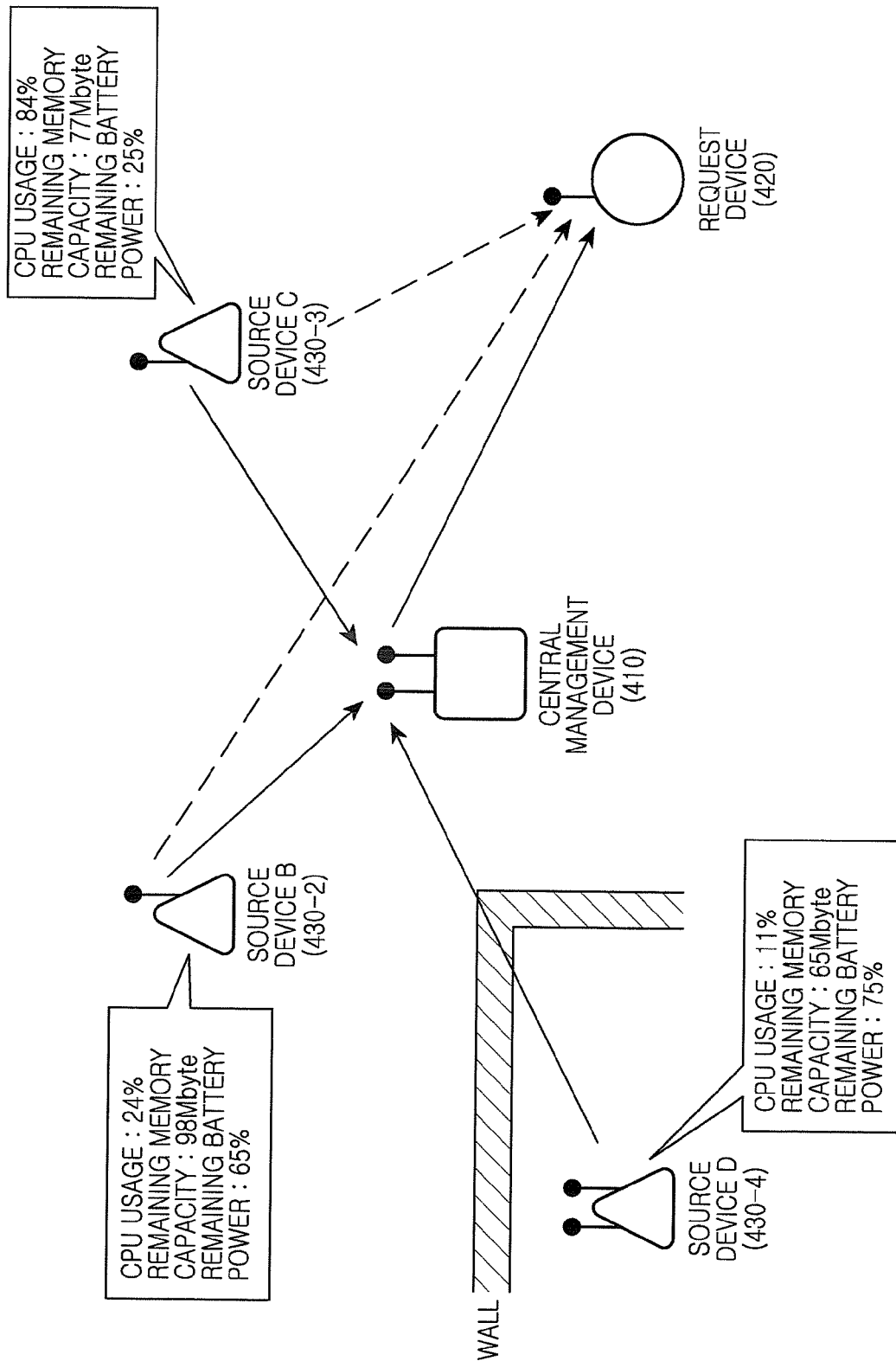
FIG. 4 illustrates another specific situation in the content sharing system according to an exemplary embodiment of the present disclosure.

FIG. 4 illustrates another specific situation in the content sharing system according to an exemplary embodiment of the present disclosure.

In FIG. 4, the content requested by a request device 420 is the multi-copy, and a source device B 430-2, a source device C 430-3, and a source device D 430-4 possess the multi-copies. The request device 420, the source B 430-2, and the source device C 430-3 support the communication protocol allowing the direct link transmission, such as WiFi-D and Bluetooth. By contrast, the source device D 430-4 does not support the communication protocol allowing the direct link, but can communicate with other devices only via the central management device 410. That is, the 1-hop link is impossible between the source device D 430-4 and the request device 420. The source device D 430-4 is isolated within the room, signals transmitted and received to and from the source device D 430-4 should penetrate the wall, and all of the other devices 410, 420, 430-2 and 430-3 including the request device 420 are placed in the living room.

Since the source device D 430-4 cannot have the direct link, there are five transmission paths between the source devices 430-2, 430-3 and 430-4 and the request device 420. Provided that the threshold $TH_{CPU}$ for the CPU usage is 65%, the CPU usage of the source device C 430-3 is 84%, which exceeds the threshold of the CPU usage. Hence, the source device C 430-3 is excluded from the transmission device. That is, the source device B 430-2 and the source device D 430-4 are selected as the transmission devices. As a result, the number of the transmission paths to predict the data rate in order to select the source device for providing the optimal data rate to deliver the content among the transmission devices, is 3. This is because the 1-hop path of the source device D 430-4 is not established compared to the situation of FIG. 3. However, even in FIG. 4, the source device and the path for providing the optimal data rate can be determined by applying the same algorithm to every transmission device and every transmission path.

Table 3 shows the information used to determine the source device and the path in the situation of FIG. 4.

TABLE 3

|  | source device B | | source device C | | source device D |
|---|---|---|---|---|---|
| remaining battery power | 65% | | 25% | | 75% |
| CPU usage percent | 4% | | 4% | | 11% |
| remaining memory capacity | 8 MByte | | 7 MByte | | 64 MByte |
| link | 1-hop | 2-hop | 1-hop | 2-hop | 2-hop |

TABLE 3-continued

| | | source device B | | source device C | | source device D |
|---|---|---|---|---|---|---|
| data rate of 1-hop path [Mbps] | source device ↔ request device | 72 | — | 65 | — | — |
| data rate of 2-hop path [Mbps] | source device ↔ management device | | | 65 | | |
| | management device ↔ request device | — | 65 | | 72 | 48 |
| | | | | 58 | | |
| end date rate | | 72 | 30.65 | 65 | 32.12 | 26.26 |
| selection (yes, no) etc. | | O | X<br>maximum data rate | X<br>exceed threshold of CPU usage | X<br>exceed threshold of CPU usage | X |

In Table 3, the source device C 430-3, of which the CPU usage exceeds the CPU threshold, is excluded from the transmission device regardless of the channel quality. Since the source device D 430-4 has no 1-hop path, only the 2-hop path of the source device D 430-4 is considered. Since the 1-hop path of the source device B 430-2 provides the maximum data rate, the source device B 430-2 is determined as the transmission device and the 1-hop path is determined as the transmission path.

Figure 5:
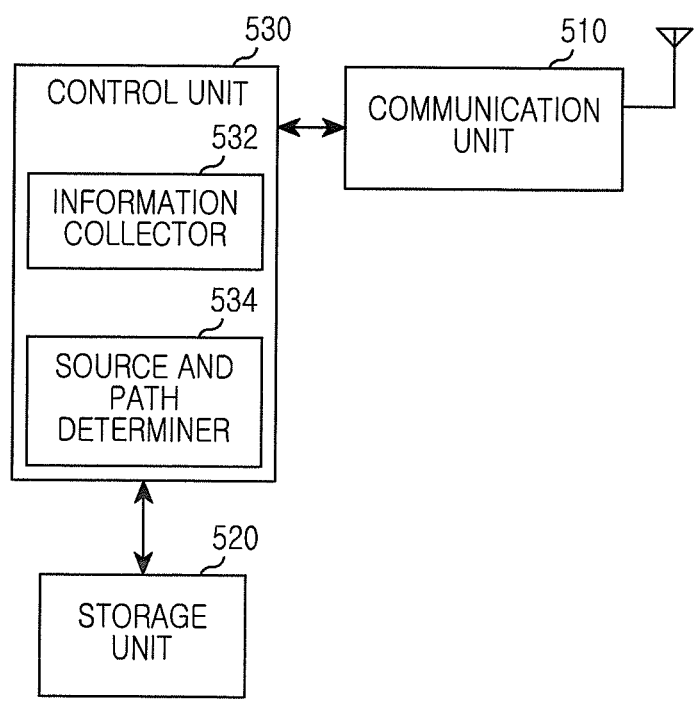
FIG. 5 illustrates a central management device in the content sharing system according to an exemplary embodiment of the present disclosure.

FIG. 5 illustrates a block diagram of the central management device in the content sharing system according to an exemplary embodiment of the present disclosure.

As shown in FIG. 5, the central management device includes a communication unit 510, a storage unit 520, and a control unit 530.

The communication unit 510 provides an interface for accessing the network. The communication unit 510 provides the wireless or wired interface. For example, the communication unit 510 can generate and analyze the radio signal according to a wireless Local Area Network (LAN) standard. The storage unit 520 stores a basic program and an application program for the operations of the central management device. The storage unit 520 provides the stored data according to a request of the control unit 530.

The control unit 530 controls the functions of the central management device. For example, the control unit 530 manages the information of the sharable contents and the information of the devices in the network, and manages the list of the contents. In particular, the control unit 530 determines the source device and the transmission path. For doing so, the control unit 530 includes an information collector 532 for collecting the available resource amount information and the channel quality information of the devices, and a source and path determiner 534 for determining the source device and the transmission path using the information collected by the information collector 532. The information collector 532 and the source and path determiner 534 can be at least one processor for realizing the corresponding function, or at least one processor for executing a software module including an instruction for the corresponding function. The software module can be stored to the storage unit 520. In an exemplary embodiment of the present disclosure, the control unit 530 controls the central management device to operate like the central management device 210 of FIG. 2. The operations of the control unit 530 for determining the source device and the transmission path are described below.

The control unit 530 receives through the communication unit 510, at least one message including at least one of one of the channel information between the request device requesting the content download and the central management device, the available resource amount information of at least one candidate device holding the content requested for the download, and the channel information between the at least one candidate device and the central management device, and the channel information between the request device and the at least one candidate device. The control device 530 determines at least one source device and transmission path for providing the content to the request device using the available resource amount of the at least one candidate device, the data rate between the request device and the central management device, the data rate between the request device and the at least one candidate device, and the data rate between the at least one candidate device and the central management device. More specifically, the control unit 530 excludes at least one of the candidate device of the CPU usage over the first threshold, the candidate device of the remaining memory capacity below the second threshold, and the candidate device of the remaining battery power below the third threshold, from the at least one candidate device, determines at least one transmission path between the at least one source device and the request device, calculates the end data rate of the at least one transmission path, and then determines the at least one source device and transmission path based on the end data rate.

Figure 6:
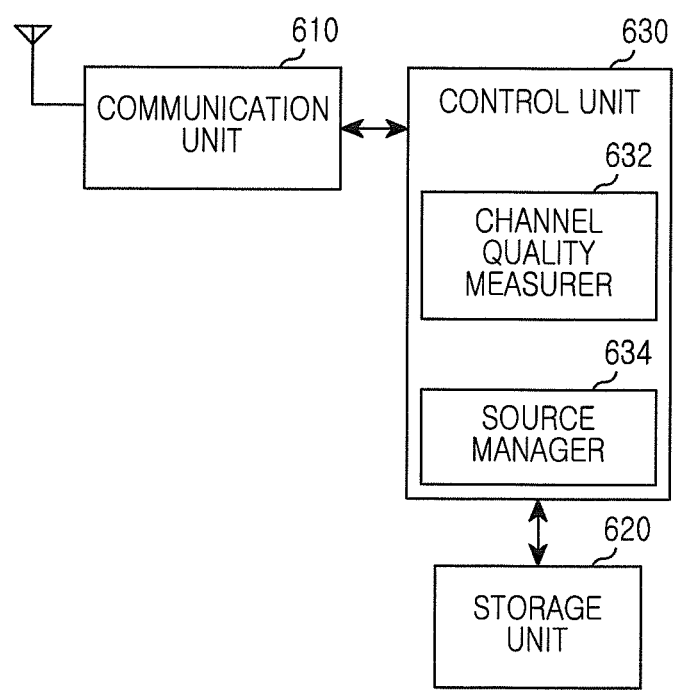
FIG. 6 illustrates a user device in the content sharing system according, to an exemplary embodiment of the present disclosure.

FIG. 6 illustrates a block diagram of the user device in the content sharing system according to an exemplary embodiment of the present disclosure.

As shown in FIG. 6, the user device includes a communication unit 610, a storage unit 620, and a control unit 630.

The communication unit 610 provides an interface for accessing the network. The communication unit 610 provides the wireless or wired interface. For example, the communication unit 610 can generate and analyze the radio signal according to the wireless LAN standard. The communication unit 610 supports the protocol for building the direct link with other device. The storage unit 620 stores a basic program for the operations of the central management device, an application program, and data such as user contents. The storage unit 620 provides the stored data according to a request of the control unit 630.

The control unit 630 controls the functions of the user device. For example, the control unit 630 controls to request the content sharing by accessing the central management device and to receive the content. In an exemplary embodiment of the present disclosure, the control unit 630 generates and provides the necessary information for the central management device to determine the source device and the transmission path for the content sharing. To provide the necessary information to determine the source device and the transmission path, the control unit 630 includes a channel quality measurer 632 for measuring the channel quality and a resource manager 634 for checking the available resource amount of the user device. The channel quality measurer 632 and the resource manager 634 can be at least one processor for realizing the corresponding function, or at least one processor for executing a software module including an instruction for the corresponding function. The software module can be stored to the storage unit 620. In an exemplary embodiment of the present disclosure, the control unit 630 controls the user device to operate like the request device 220 or the source device 230 of FIG. 2. The operations of the control unit 630 for providing the necessary information to determine the source device and the transmission path are described below.

When the user device downloads the content, the control unit 630 measures the channel quality with the central management device based on the signal received for the content download request, and transmits the channel quality to the central management device via the communication unit 610 using the message transmitted for the content download request. Next, when the central management device notifies at least one candidate device for providing the download-requested content, the control unit 630 measures the channel quality with the at least one candidate device and transmits the channel quality of the at least one candidate device to the central management device through the communication unit 610.

When the user device provides the content, the control unit 630 receives the available resource amount information request from the central management device, measures the channel quality with the central management device using the received signal in order to request the available resource amount information, and then transmits the available resource amount information and the channel quality to the central management device through the communication unit 610. Next, when the central management device notifies the source device determined, the control unit 630 provides the content to the request device which requests the content download.

The user terminal as illustrated as FIG. 6 may be implemented in an electronic device including a portable terminal such as, for example, a smart phone and a mobile telecommunication terminal. Hereunder, a portable terminal is used as an example for the electronic device.

In this exemplary embodiment of the present disclosure, the source device and the transmission path are determined by the central management device. Alternatively, the request device can determine the source device and the transmission path by itself. In this example, the request device receives the available resource amount information and the channel quality information directly from the central management device or the other devices. The request device reports the determined source device and the determined transmission path to the central management device.

As set forth above, the optimal QoS can be ensured in the content sharing system by predicting the data rate of every transmission path using the information such as transport protocol of the source devices, number of the antennas, source device, channel condition, and available resource amount and selecting the source device and the transmission path for transmitting the content based on the predicted data rate.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a gateway in a wireless environment, the method comprising:
   receiving, from a terminal, a message for requesting a content, the message comprising first information regarding a quality of a first channel between the terminal and the gateway;
   receiving, from a first device storing the content, a message comprising second information regarding a quality of a second channel between the first device and the gateway;
   receiving, from a second device storing the content, a message comprising third information regarding a quality of a third channel between the second device and the gateway;
   identifying that the first device is capable of communicating with the terminal via a direct path;
   transmitting, to the first device, a message regarding information for establishing a direct connection with the first device;
   receiving, from the terminal, fourth information regarding a quality of a fourth channel between the terminal and the first device; and
   determining, based on the first information, the second information, the third information, and the fourth information, a path for providing the content among a first path, a second path, and a third path,
   wherein the first path is configured with the first channel and the second channel, wherein the second path is configured with the first channel and the third channel, and wherein the third path is configured with the fourth channel, wherein the first device and the second device is selected among a plurality of candidate devices, based on current load corresponding to each of the plurality of candidate devices, wherein the current load comprises a processor usage, a remaining memory capacity, and a remaining battery power, and wherein the first device and the second device is selected by excluding, from the plurality of candidate devices, at least one candidate device having the processor usage over a first threshold, having the remaining memory capacity below a second threshold, or having the remaining battery power below a third threshold.

2. The method of claim 1, further comprising transmitting, to the device included in the determined path, a message for instructing to transmit the content to the terminal via the determined path.

3. The method of claim 1, wherein the determining, based on the first information, the second information, the third information, and the fourth information, a path for providing the content among a first path, a second path, and a third path comprises:

calculating a respective end data rate of the first path, the second path, and the third path; and determining the path and the device included in the path based on the end data rate.

4. The method of claim 3, wherein the calculating the respective end data rate of the first path, the second path, and the third path comprises:

calculating a data rate of at least one channel between the plurality of candidate devices and the terminal using at least one of a current channel quality value, a number of antennas of each of the plurality of candidate devices, the number of antennas of the terminal, or a transport protocol of each of the plurality of candidate devices;

calculating a data rate of the channel between the gateway and the terminal using at least one of the current channel quality value, the number of antennas of the gateway, the number of antennas of the terminal, or a transport protocol of the terminal; and calculating a data rate of at least one channel between the plurality of candidate devices and the gateway using at least one of the current channel quality value, the number of the antennas of each of the plurality of candidate devices, the number of the antennas of the gateway, or the transport protocol of each of the plurality of candidate devices.

5. The method of claim 4, wherein the end data rate is calculated using the data rate of each channel.

6. The method of claim 1, wherein the path comprises a two-hop path via the gateway device between the first device and the terminal, and a one-hop path between the first device capable of communicating with the terminal via the direct path.

7. An apparatus for operating in a wireless environment, the apparatus comprising:

a communication interface comprising at least one of a wired interface or a wireless transceiver, the communication interface configured to:

receive, from a terminal, a message for requesting a content, the message comprising first information regarding a quality of a first channel between the terminal and a gateway;

receive, from a first device storing the content, a message comprising second information regarding a quality of a second channel between the first device and the gateway; and receive, from a second device storing the content, a message comprising third information regarding a quality of a third channel between the second device and the gateway;

a central processing unit (CPU) of a gateway coupled to a memory, the CPU configured to:

identify that the first device is capable of communicating with the terminal via a direct path; and wherein the communication interface is further configured to:

transmit, to the first device, a message regarding information for establishing a direct connection with the first device; and receive, from the terminal, fourth information regarding a quality of a fourth channel between the terminal and the first device; and wherein the central processing unit of the gateway is further configured to determine, based on the first information, the second information, the third information, and the fourth information, a path for providing the content among a first path, a second path, and a third path, wherein the first path is configured with the first channel and the second channel, wherein the second path is configured with the first channel and the third channel, and wherein the third path is configured with the fourth channel, wherein the CPU is further configured to select the first device and the second device among a plurality of candidate devices, based on current load corresponding to each of the plurality of candidate devices, and wherein the CPU is configure to select the first device and the second device by: excluding, from the plurality of candidate devices, at least one candidate device having a processor usage over a first threshold, having a remaining memory capacity below a second threshold, or having a remaining battery power below a third threshold.

8. The apparatus of claim 7, wherein communication interface is further configured to transmit, to the device included in the determined path, a message for instructing to transmit the content to the terminal via the determined path.

9. The apparatus of claim 7, wherein the path comprises a two-hop path via the gateway device between the first device and the terminal, and a one-hop path between the first device capable of communicating with the terminal via the direct path.

* * * * *